United States Patent
Finley et al.

(10) Patent No.: US 10,494,108 B1
(45) Date of Patent: Dec. 3, 2019

(54) SYSTEM AND METHOD FOR PROVIDING ICING CONDITION WARNINGS

(71) Applicant: Rockwell Collins, Inc., Cedar Rapids, IA (US)

(72) Inventors: Jeffery A. Finley, Cedar Rapids, IA (US); Jean-Philippe Wasselin, Toulouse (FR)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 701 days.

(21) Appl. No.: 15/157,368

(22) Filed: May 17, 2016

(51) Int. Cl.
  *B64D 15/20* (2006.01)
  *G01S 13/95* (2006.01)
  *G08B 19/02* (2006.01)

(52) U.S. Cl.
  CPC ............ *B64D 15/20* (2013.01); *G01S 13/953* (2013.01); *G08B 19/02* (2013.01)

(58) Field of Classification Search
  USPC .......................................................... 342/26
  See application file for complete search history.

(56) References Cited

U.S. PATENT DOCUMENTS

| | | |
|---|---|---|
| 650,275 A | 5/1900 | Reeve |
| 3,251,057 A | 5/1966 | Buehler et al. |
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

Heymsfield, A.J., A. Bansemer, C. Schmitt, C. Twohy, and M.R. Poellot, 2004: Effective Ice Particle Densities Derived from Aircraft Data. J. Atmos. Sci., 61, 982-1003,https://doi.org/10.1175/1520-0469(2004)061<0982:EIPDDF>2.0.CO;2 (Year: 2004).*

(Continued)

*Primary Examiner* — Marcus E Windrich
(74) *Attorney, Agent, or Firm* — Donna P. Suchy; Daniel M. Barbieri (57) ABSTRACT

A hazard warning system can be utilized in an aircraft. The hazard warning system can include a processing system configured to determine an icing condition. The icing condition can be annunciated and/or displayed. An avionic display can be used to display the icing condition in response to a sum of icing concentration factors along a radial or flight path.

20 Claims, 4 Drawing Sheets

(56) References Cited

U.S. PATENT DOCUMENTS

| | | | |
|---|---|---|---|
| 3,964,064 A | 6/1976 | Brandao et al. | |
| 3,968,490 A | 7/1976 | Gostin | |
| 4,015,257 A | 3/1977 | Fetter | |
| 4,043,194 A | 8/1977 | Tanner | |
| 4,223,309 A | 9/1980 | Payne | |
| 4,283,715 A | 8/1981 | Choisnet | |
| 4,283,725 A | 8/1981 | Chisholm | |
| 4,318,100 A | 3/1982 | Shimizu et al. | |
| 4,346,595 A | 8/1982 | Frosch et al. | |
| 4,430,654 A | 2/1984 | Kupfer | |
| 4,435,707 A | 3/1984 | Clark | |
| 4,459,592 A | 7/1984 | Long | |
| 4,533,915 A | 8/1985 | Lucchi et al. | |
| 4,555,703 A | 11/1985 | Cantrell | |
| 4,600,925 A | 7/1986 | Alitz et al. | |
| 4,613,937 A | 9/1986 | Batty, Jr. | |
| 4,613,938 A | 9/1986 | Hansen et al. | |
| 4,649,388 A | 3/1987 | Atlas | |
| 4,658,255 A | 4/1987 | Nakamura et al. | |
| 4,660,038 A | 4/1987 | Greneker, III | |
| 4,684,950 A | 8/1987 | Long | |
| 4,742,353 A | 5/1988 | D'Addio et al. | |
| 4,761,650 A | 8/1988 | Masuda et al. | |
| 4,803,470 A * | 2/1989 | Fineman | G01N 21/43 |
| | | | 340/583 |
| 4,835,536 A | 5/1989 | Piesinger et al. | |
| RE33,152 E | 1/1990 | Atlas | |
| 4,914,444 A | 4/1990 | Pifer et al. | |
| 4,928,131 A | 5/1990 | Onozawa | |
| 4,940,987 A | 7/1990 | Frederick | |
| 5,036,334 A | 7/1991 | Henderson et al. | |
| 5,049,886 A | 9/1991 | Seitz et al. | |
| 5,057,820 A | 10/1991 | Markson et al. | |
| 5,077,558 A | 12/1991 | Kuntman | |
| 5,095,754 A * | 3/1992 | Hsu | B64D 15/20 |
| | | | 340/962 |
| 5,105,191 A | 4/1992 | Keedy | |
| 5,130,712 A | 7/1992 | Rubin et al. | |
| 5,159,407 A | 10/1992 | Churnside et al. | |
| 5,164,731 A | 11/1992 | Borden et al. | |
| 5,173,704 A | 12/1992 | Buehler et al. | |
| 5,175,551 A | 12/1992 | Rubin | |
| 5,177,487 A | 1/1993 | Taylor et al. | |
| 5,198,819 A | 3/1993 | Susnjara | |
| 5,202,690 A | 4/1993 | Frederick | |
| 5,208,600 A | 5/1993 | Rubin | |
| 5,221,924 A | 6/1993 | Wilson, Jr. | |
| 5,262,773 A | 11/1993 | Gordon | |
| 5,262,782 A | 11/1993 | Rubin et al. | |
| 5,291,208 A | 3/1994 | Young | |
| 5,296,865 A | 3/1994 | Lewis | |
| 5,311,183 A | 5/1994 | Mathews et al. | |
| 5,311,184 A | 5/1994 | Kuntman | |
| 5,331,330 A | 7/1994 | Susnjara | |
| 5,396,220 A | 3/1995 | Markson et al. | |
| 5,402,116 A | 3/1995 | Ashley | |
| 5,469,168 A | 11/1995 | Anderson | |
| 5,479,173 A | 12/1995 | Yoshioka et al. | |
| 5,485,157 A | 1/1996 | Long | |
| 5,517,193 A | 5/1996 | Allison et al. | |
| 5,521,603 A | 5/1996 | Young | |
| 5,534,868 A | 7/1996 | Gjessing et al. | |
| 5,568,151 A | 10/1996 | Merritt | |
| 5,583,972 A | 12/1996 | Miller | |
| 5,592,171 A | 1/1997 | Jordan | |
| 5,602,543 A | 2/1997 | Prata et al. | |
| 5,615,118 A | 3/1997 | Frank | |
| 5,648,782 A | 7/1997 | Albo et al. | |
| 5,654,700 A | 8/1997 | Prata et al. | |
| 5,657,009 A | 8/1997 | Gordon | |
| 5,686,919 A | 11/1997 | Jordan et al. | |
| 5,726,656 A | 3/1998 | Frankot | |
| 5,757,322 A | 5/1998 | Ray et al. | |
| 5,771,020 A | 6/1998 | Markson et al. | |
| 5,828,332 A | 10/1998 | Frederick | |
| 5,838,239 A | 11/1998 | Stern et al. | |
| 5,839,080 A | 11/1998 | Muller et al. | |
| 5,907,568 A | 5/1999 | Reitan, Jr. | |
| 5,920,276 A | 7/1999 | Frederick | |
| 5,945,926 A | 8/1999 | Ammar et al. | |
| 5,973,635 A | 10/1999 | Albo | |
| 5,974,875 A | 11/1999 | Leslie et al. | |
| 6,000,285 A | 12/1999 | Leslie et al. | |
| 6,034,760 A | 3/2000 | Rees | |
| 6,043,756 A | 3/2000 | Bateman et al. | |
| 6,043,757 A | 3/2000 | Patrick | |
| 6,081,220 A | 6/2000 | Fujisaka et al. | |
| 6,118,382 A * | 9/2000 | Hibbs | A62B 9/00 |
| | | | 340/573.1 |
| 6,138,060 A | 10/2000 | Conner et al. | |
| 6,154,151 A | 11/2000 | McElreath et al. | |
| 6,154,169 A | 11/2000 | Kuntman | |
| 6,177,873 B1 | 1/2001 | Cragun | |
| 6,201,494 B1 | 3/2001 | Kronfeld | |
| 6,208,284 B1 | 3/2001 | Woodell et al. | |
| 6,236,351 B1 | 5/2001 | Conner et al. | |
| 6,237,405 B1 | 5/2001 | Leslie | |
| 6,240,369 B1 | 5/2001 | Foust | |
| 6,246,367 B1 | 6/2001 | Markson et al. | |
| 6,281,832 B1 | 8/2001 | McElreath | |
| 6,289,277 B1 | 9/2001 | Feyereisen et al. | |
| 6,297,772 B1 | 10/2001 | Lewis | |
| 6,320,511 B1 * | 11/2001 | Cronin | B64D 15/20 |
| | | | 340/580 |
| 6,339,747 B1 | 1/2002 | Daly et al. | |
| 6,340,946 B1 | 1/2002 | Wolfson et al. | |
| 6,377,202 B1 | 4/2002 | Kropfli et al. | |
| 6,377,207 B1 | 4/2002 | Solheim et al. | |
| 6,381,538 B1 | 4/2002 | Robinson et al. | |
| 6,388,607 B1 | 5/2002 | Woodell | |
| 6,388,608 B1 | 5/2002 | Woodell et al. | |
| RE37,725 E | 6/2002 | Yamada | |
| 6,405,134 B1 | 6/2002 | Smith et al. | |
| 6,424,288 B1 | 7/2002 | Woodell | |
| 6,441,773 B1 | 8/2002 | Kelly et al. | |
| 6,456,226 B1 | 9/2002 | Zheng et al. | |
| 6,480,142 B1 | 11/2002 | Rubin | |
| 6,496,252 B1 | 12/2002 | Whiteley | |
| 6,501,392 B2 | 12/2002 | Gremmert et al. | |
| 6,512,476 B1 | 1/2003 | Woodell | |
| 6,518,914 B1 | 2/2003 | Peterson et al. | |
| 6,549,161 B1 | 4/2003 | Woodell | |
| 6,560,538 B2 | 5/2003 | Schwinn et al. | |
| 6,563,452 B1 | 5/2003 | Zheng et al. | |
| 6,577,947 B1 | 6/2003 | Kronfeld et al. | |
| 6,590,520 B1 | 7/2003 | Steele et al. | |
| 6,597,305 B2 | 7/2003 | Szeto et al. | |
| 6,603,425 B1 | 8/2003 | Woodell | |
| 6,606,564 B2 | 8/2003 | Schwinn et al. | |
| 6,614,382 B1 | 9/2003 | Cannaday et al. | |
| 6,650,972 B1 | 11/2003 | Robinson et al. | |
| 6,667,710 B2 | 12/2003 | Cornell et al. | |
| 6,670,908 B2 | 12/2003 | Wilson et al. | |
| 6,677,886 B1 | 1/2004 | Lok | |
| 6,683,609 B1 | 1/2004 | Baron et al. | |
| 6,690,317 B2 | 2/2004 | Szeto et al. | |
| 6,703,945 B2 | 3/2004 | Kuntman et al. | |
| 6,720,906 B2 | 4/2004 | Szeto et al. | |
| 6,738,010 B2 | 5/2004 | Steele et al. | |
| 6,741,203 B1 | 5/2004 | Woodell | |
| 6,744,382 B1 | 6/2004 | Lapis et al. | |
| 6,771,207 B1 | 8/2004 | Lang | |
| 6,788,043 B2 | 9/2004 | Murphy et al. | |
| 6,791,311 B2 | 9/2004 | Murphy et al. | |
| 6,828,922 B1 | 12/2004 | Gremmert et al. | |
| 6,828,923 B2 | 12/2004 | Anderson | |
| 6,839,018 B2 | 1/2005 | Szeto et al. | |
| 6,850,185 B1 | 2/2005 | Woodell | |
| 6,856,908 B2 | 2/2005 | Devarasetty et al. | |
| 6,879,280 B1 | 4/2005 | Bull et al. | |
| 6,882,302 B1 | 4/2005 | Woodell et al. | |
| 6,917,860 B1 | 7/2005 | Robinson et al. | |
| 6,977,608 B1 | 12/2005 | Anderson et al. | |
| 7,030,805 B2 | 4/2006 | Ormesher et al. | |

(56) References Cited

U.S. PATENT DOCUMENTS

| | | |
|---|---|---|
| 7,042,387 B2 | 5/2006 | Ridenour et al. |
| 7,082,382 B1 | 7/2006 | Rose et al. |
| 7,109,912 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 * | 1/2007 | Finley .................... G01S 7/062 |
| 7,200,491 B1 | 4/2007 | Rose et al. |
| 7,205,928 B1 | 4/2007 | Sweet |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1 | 4/2015 | Finley et al. |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0117311 A1 | 6/2003 | Funai |
| 2003/0193411 A1 | 10/2003 | Price |
| 2004/0183695 A1 | 9/2004 | Ruokangas et al. |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2006/0036366 A1 | 2/2006 | Kelly et al. |
| 2007/0005249 A1 | 1/2007 | Dupree et al. |
| 2007/0152867 A1 | 7/2007 | Randall |
| 2008/0158049 A1 | 7/2008 | Southard et al. |
| 2009/0177343 A1 * | 7/2009 | Bunch .................... G01S 7/22 701/14 |
| 2009/0219197 A1 | 9/2009 | Bunch |
| 2010/0019938 A1 | 1/2010 | Bunch |
| 2010/0042275 A1 | 2/2010 | Kirk |
| 2010/0110431 A1 | 5/2010 | Ray et al. |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0302094 A1 | 12/2010 | Bunch et al. |
| 2011/0074624 A1 | 3/2011 | Bunch |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 * | 9/2013 | Bunch .................... G01W 1/00 342/26 B |
| 2014/0176362 A1 | 6/2014 | Sneed |
| 2014/0362088 A1 | 12/2014 | Veillette et al. |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 A1 | 11/2009 |

OTHER PUBLICATIONS

Final Office Action for U.S. Appl. No. 15/213,256 dated Oct. 19, 2018. 9 pages.
U.S. Appl. No. 11/256,845, filed Oct. 24, 2005, Woodell et al.
U.S. Appl. No. 11/402,434, filed Apr. 12, 2006, Woodell et al.
U.S. Appl. No. 12/075,103, filed Mar. 7, 2008, Woodell et al.
U.S. Appl. No. 13/246,769, filed Sep. 27, 2011, Rockwell Collins.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/162,035, filed Jan. 23, 2014, Kevin M. Kronfeld et al.
U.S. Appl. No. 14/206,239, filed Mar. 12, 2014, Rockwell Collins.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Arlen E. Breiholz et al.
U.S. Appl. No. 14/608,071, filed Jan. 28, 2015, Breiholz et al.
3-D Weather Hazard and Avoidance System, Honeywell InteVue Brochure dated Nov. 2008, 4 pages.
Advisory Action for U.S. Appl. No. 12/075,103, dated Feb. 13, 2013, 3 pages.
Advisory Action for U.S. Appl. No. 12/075,103, dated Nov. 8, 2010, 3 pages.
Advisory Action for U.S. Appl. No. 12/075,103, dated Oct. 15, 2010, 3 pages.
Boudevillain et al., 2003, Assessment of Vertically Integrated Liquid (VIL) Water Content Radar Measurement, J. Atmos. Oceanic Technol., 20, 807-819.

(56) References Cited

OTHER PUBLICATIONS

Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.II.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 12/892,663 dated Mar. 7, 2013, 13 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Final Office Action on U.S. Appl. No. 13/246,769 dated Sep. 16, 2014, 18 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 13/238,606 dated May 27, 2015, 14 pages.
Non-Final Office Action on U.S. Appl. No. 14/452,235 dated Apr. 23, 2015, 9 pages.
Non-Final Office Action on U.S. Appl. No. 14/681,901 dated Jun. 17, 2015, 21 pages.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Mar. 27, 2015, 21 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Non-Final Office Action on U.S. Appl. No. 13/717,052 dated Sep. 9, 2014, 8 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/162,035, dated Feb. 4, 2016, 9 pages.
Non-Final Office Action on U.S. Appl. No. 14/086,844, dated Nov. 10, 2015, 17 pages.
Notice of Allowance for U.S. Appl. No. 10/631,253, dated Jul. 28, 2005, 7 pages.
Notice of Allowance for U.S. Appl. No. 11/256,845, dated May 27, 2009, 7 pages.
Notice of Allowance for U.S. Appl. No. 11/370,085, dated Dec. 30, 2008, 6 pages.
Notice of Allowance for U.S. Appl. No. 11/402,434, dated Nov. 4, 2008, 6 pages.
Notice of Allowance for U.S. Appl. No. 12/474,102, dated Jan. 20, 2012, 6 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Notice of Allowance on U.S. Appl. No. 14/681,901, dated Dec. 23, 2015, 8 pages.
Office Action for U.S. Appl. No. 11/256,845, dated Aug. 21, 2007, 4 pages.
Office Action for U.S. Appl. No. 10/631,253, dated Jan. 14, 2004, 5 pages.
Office Action for U.S. Appl. No. 10/631,253, dated Jun. 30, 2004, 4 pages.
Office Action for U.S. Appl. No. 11/256,845, dated Dec. 5, 2006, 5 pages.
Office Action for U.S. Appl. No. 11/256,845, dated Jul. 28, 2008, 5 pages.
Office Action for U.S. Appl. No. 11/256,845, dated Jun. 22, 2006, 5 pages.
Office Action for U.S. Appl. No. 11/370,085, dated Aug. 15, 2007, 10 pages.
Office Action for U.S. Appl. No. 11/370,085, dated Dec. 4, 2007, 13 pages.
Office Action for U.S. Appl. No. 11/370,085, dated Oct. 9, 2008, 5 pages.
Office Action for U.S. Appl. No. 11/402,434, dated Jul. 17, 2008, 5 pages.
Office Action for U.S. Appl. No. 11/402,434, dated Mar. 29, 2007, 8 pages.
Office Action for U.S. Appl. No. 11/402,434, dated Oct. 26, 2006, 7 pages.
Office Action for U.S. Appl. No. 11/402,434, dated Sep. 20, 2007, 7 pages.
Office Action for U.S. Appl. No. 12/075,103, dated Feb. 26, 2010, 11 pages.
Office Action for U.S. Appl. No. 12/075,103, dated Jul. 29, 2010, 7 pages.
Office Action for U.S. Appl. No. 12/075,103, dated Jun. 20, 2012, 5 pages.
Office Action for U.S. Appl. No. 12/075,103, dated Nov. 29, 2012, 6 pages.

(56) References Cited

OTHER PUBLICATIONS

Office Action for U.S. Appl. No. 12/474,102, dated Sep. 7, 2011, 8 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Apr. 9, 2014, 5 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Office Action on U.S. Appl. No. 13/717,052 dated Dec. 23, 2013, 7 pages.
Pessi et al., On the Relationship Between Lightning and Convective Rainfall Over the Central Pacific Ocean, date unknown, 9 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Office Action on U.S. Appl. No. 13/717,052 dated Mar. 27, 2014, 6 pages.
U.S. Office Action on U.S. Appl. No. 14/206,239 dated Jun. 16, 2016.
U.S. Office Action on U.S. Appl. No. 14/206,651 dated Jun. 23, 2016.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser et al., The Vertical Profile of Radar Reflectivity and Convective Cells: A Strong Indicator of Storm Intensity and Lightning Probability? America Meteorological Society, 1994, 9 pages.
Final Office Action on U.S. Appl. No. 14/206,239, dated Oct. 13, 2016, 17 pages.
Final Office Action on U.S. Appl. No. 14/206,651, dated Dec. 8, 2016, 14 pages.
Final Office Action on U.S. Appl. No. 14/207,034, dated Oct. 13, 2016, 15 pages.
Non-Final Office Action for U.S. Appl. No. 14/207,034 dated Mar. 24, 2017. 16 pages.
Non-Final Office Action for U.S. Appl. No. 15/213,256 dated Apr. 27, 2018. 6 pages.
Non-Final Office Action on U.S. Appl. No. 14/162,035 dated Jul. 11, 2016, 10 pages.
Non-Final Office Action on U.S. Appl. No. 14/206,239, dated Feb. 24, 2017, 14 pages.
Non-Final Office Action on U.S. Appl. No. 14/207,034 dated Jun. 23, 2016, 14 pages.
Non-Final Office Action on U.S. Appl. No. 14/465,753, dated Apr. 4, 2016, 12 pages.
Non-Final Office Action on U.S. Appl. No. 15/137,645 dated Aug. 8, 2016, 6 pages.
Notice of Allowance for U.S. Appl. No. 14/206,239 dated Aug. 31, 2017. 9 pages.
Notice of Allowance for U.S. Appl. No. 14/207,034 dated Jul. 13, 2017. 9 pages.
Notice of Allowance on U.S. Appl. No. 14/086,844, dated Jun. 22, 2016, 8 pages.
Notice of Allowance on U.S. Appl. No. 14/206,651, dated Mar. 3, 2017, 8 pages.
Notice of Allowance on U.S. Appl. No. 14/465,753, dated Aug. 29, 2016, 8 pages.
Entry for the word, "gradient" at Britannica Academic, at academic.eb.com. Accessed on Oct. 16, 2018. (Year:2018).
Entry for the word, "gradient" at Wolfram MathWorld, at mathworld.wolfram.com. Accessed on Oct. 16, 2018. (Year:2018).
Final Office Action for U.S. Appl. No. 15/213,256 dated Oct. 19, 2018. 8 pages.
Notice of Allowance for U.S. Appl. No. 15/213,256 dated Jan. 11, 2019.

\* cited by examiner

SYSTEM AND METHOD FOR PROVIDING ICING CONDITION WARNINGS

CROSS REFERENCE TO RELATED APPLICATIONS

The present application is related to U.S. Pat. No. 9,846,230 filed Dec. 21, 2015 which is a continuation-in-part of U.S. Pat. Nos. 9,864,055, 9,823,347, 9,720,082 and 9,244,166. The present application is also related to U.S. Pat. No. 9,395,438, which is a continuation of U.S. Pat. No. 8,902,100. The present application is also related to U.S. Pat. Nos. 7,515,087, 7,486,219, 7,598,902, and 7,129,885, all of which are herein incorporated by reference in their entireties and assigned to the assignee of the present application.

BACKGROUND

Embodiments of the inventive concepts disclosed herein generally relate to the display of a weather hazard warning, and more particularly, but not by way of limitation to the display of a weather hazard warning related to one or more icing conditions.

Conventional aircraft hazard weather radar systems, such as the WXR 2100 MultiScan™ radar system manufactured by Rockwell Collins, Inc., have Doppler capabilities and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes.

Ice crystals pose threats to aircraft and their components. For example, sensors can provide improper readings when clogged by ice. Probes and engines can also be susceptible to damage caused by mixed phase and glaciated ice crystals when operating near areas of deep convection and at higher altitudes. Engine rollback issues are believed to be related to ice crystal accretion, followed by aggregate detachment in solid form before continuing through the aircraft engine. Detection and display of high altitude ice crystallization has been proposed.

SUMMARY

In one aspect, the inventive concepts disclosed herein are directed to an aircraft hazard warning system. The aircraft hazard warning system includes a processing system configured to cause an electronic display to display an icing condition symbol in response to a presence of an icing condition. The processing system is configured to determine the presence of the icing condition using summation of an icing concentration factor at locations along an azimuth.

In a further aspect, the inventive concepts disclosed herein are directed to a method of providing an icing condition symbol on an electronic aircraft display using an electronic processor. The method includes receiving radar reflectivity data, determining an ice concentration factor for each of a number of range bins associated with respective location, and displaying the icing condition symbol in response to a summation of the ice concentration factor at each of the range bins being in a relationship with a threshold.

In a further aspect, the inventive concepts disclosed herein are directed to an aircraft weather radar system. The aircraft weather radar system includes a radar antenna configured to receive radar returns, and a processing system in communication with the radar antenna. The processing system is configured to receive the radar returns and provide radar return data. The processing system is also configured to determine a number of ice concentration factors for a number of respective range bins associated with the radar returns using the radar return data. The processing system is also configured to determine a presence of an icing condition using a relationship between a combination of the ice concentration factors and a threshold.

In yet further aspects, the inventive concepts disclosed herein relate to an icing warning can be displayed using bars, regions, or lines indicating a location of the icing condition and/or a level of the icing condition.

BRIEF DESCRIPTION OF THE DRAWINGS

Some embodiments will become more fully understood from the following detailed description, taken in conjunction with the accompanying drawings, wherein like reference numerals refer to like elements, and.

DETAILED DESCRIPTION

Hazard warning systems and methods according to the inventive concepts disclosed herein detect one or more icing conditions and display one or more icing condition warnings. In some embodiments, systems and methods discussed herein provide icing condition warnings that are more elegantly displayed than proposed methods such as methods that place a color over any areas where radar reflectivity exceeds a predetermined threshold in some embodiments. Advantageously, the warnings are provided to make the crew aware of hazardous icing conditions or ice crystal concentration without effectively blocking off large portions of the display or human machine interface (HMI) in some embodiments. Further, the warnings are provided to represent levels of icing conditions in a fashion that is less likely to confuse the crew when presented with other HMI information, such as, navigation beacons, flight path information, runway icons, textual information, weather regions, or symbols found overlaid with weather displays in some embodiments.

In some embodiments, the systems and methods detect icing conditions by considering not only ice crystal density but duration of the exposure by the aircraft, the type of aircraft/engine, and the specific flight path. In some embodiments, the systems and methods advantageously integrate ice crystal concentration detected by weather radar and show such detected regions along flight paths or radials where the integrated concentration exceeds a predetermined threshold. In some embodiments, the detected regions are only shown for flight paths or radials where the integrated concentration exceeds a predetermined threshold.

Figure 1:
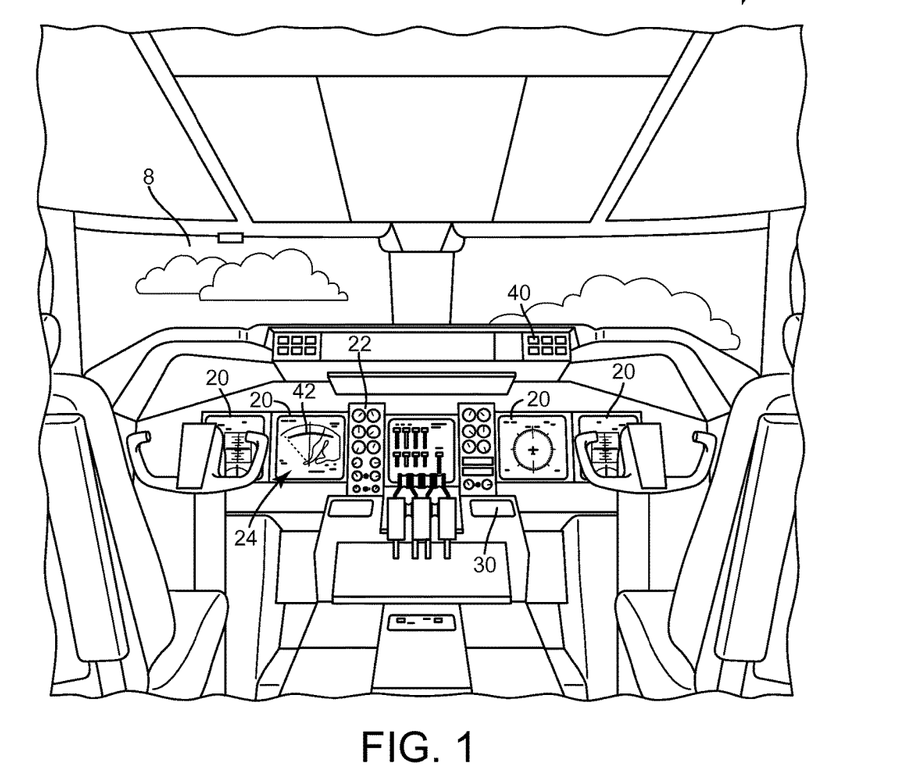
FIG. 1 is a perspective view schematic illustration of an aircraft control center, according to some embodiments.

Referring now to FIG. 1, an illustration of an aircraft control center 10 or cockpit is shown, according to some embodiments. The aircraft control center 10 includes displays 20 (e.g., flight display) and controls 22 for a human machine interface (HMI) which are generally used to increase visual range and to enhance decision-making abilities. In some embodiments, the displays 20 may provide an output from a radar system, communication devices, and other sensors of the aircraft. For example, the displays 20 may provide a top-down view, a horizontal view, vertical view/perspective or 3 dimensional view, or any other view of weather and/or terrain detected by a radar system on the aircraft. The views of weather may include monochrome or color graphical representations 24 of the weather on the display. The controls 22 of the aircraft control center 10 may further include other user interface elements such as knobs, joysticks or touch interfaces, an audio device 30 (e.g., speaker, electro-acoustic transducer, etc.) and illuminating or flashing lamps 40. Weather can be displayed as colored regions on the displays 20 according to ARINC standards.

In some embodiments, an icing condition warning 42 is provided on any of displays 20 as part of a weather radar display or other flight display. In some embodiments, the icing condition warning 42 is displayed as colored line or bar indicating the presence and level of the icing condition. In some embodiments, the icing condition warning is an icon or symbol.

Figure 2:
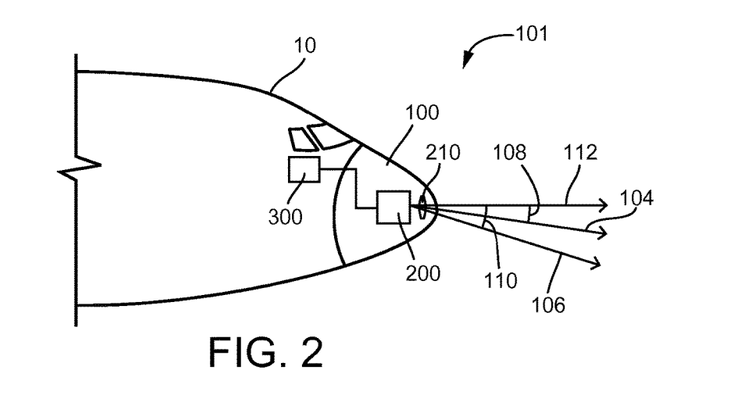
FIG. 2 is a side view schematic illustration of the nose of an aircraft including a weather radar system, according to some embodiments.

Referring to FIG. 2, the front of an aircraft 101 is shown with aircraft control center 10 and nose 100, according to an exemplary embodiment. A hazard warning system 300 is configured to provide icing condition warnings such as the icing condition warning 42 to the displays 20 (FIG. 1) in some embodiments. The hazard warning system 300 includes or is in communication with a radar system 200 in some embodiments.

The radar system 200 (e.g., a weather radar system or other radar system) is generally located within the nose 100 of the aircraft 101 or within the aircraft control center 10 of aircraft 101. According to some embodiments, the radar system 200 is located on the top of aircraft 101 or on the tail of aircraft 101. The radar system 200 can include or be coupled to an antenna system including an antenna 210. A variety of different antennas or radar systems may be used as part of the radar system 200 (e.g., a split aperture antenna, a monopulse antenna, a sequential lobbing antenna, etc.).

The radar system 200 generally works by sweeping a radar beam horizontally back and forth across the sky. Some embodiments of the radar system 200 conduct a first horizontal sweep 104 first tilt angle 1 (a tilt angle 108) and a second horizontal sweep 106 at second tilt angle (a tilt angle 110). The tilt angles 108 and 110 can be with respect to horizontal 112 (e.g., 0 degrees). The radar system 200 can also conduct vertical sweeps to further characterize and identify weather phenomena. Returns from different tilt angles can be electronically merged to form a composite image for display on an electronic display (e.g., one of the displays 20 in FIG. 1). Returns can also be processed to, for example, distinguish between terrain and weather, to determine the height of terrain, or to determine the height of weather. The radar system 200 can be a WXR-2100 Multi-Scan™ radar system or similar system manufactured by Rockwell Collins and configured as described herein. According to other embodiments, the radar system 200 may be an RDR-4000 system or similar system manufactured by Honeywell International, Inc. configured as described herein. The radar system 200 may be integrated with other avionic equipment and user interface elements in the aircraft control center 10 (e.g., the flashing lights 40, the displays 20, display elements on a weather radar display, display elements on a terrain display, audio devices 30, navigation systems, TAWs equipment, etc.). In some embodiments, the radar system 200 includes dual polarization or dual frequency capabilities that allow sensing of ice crystal concentrations based upon a comparison of returns at different polarizations or frequencies.

Figure 3:
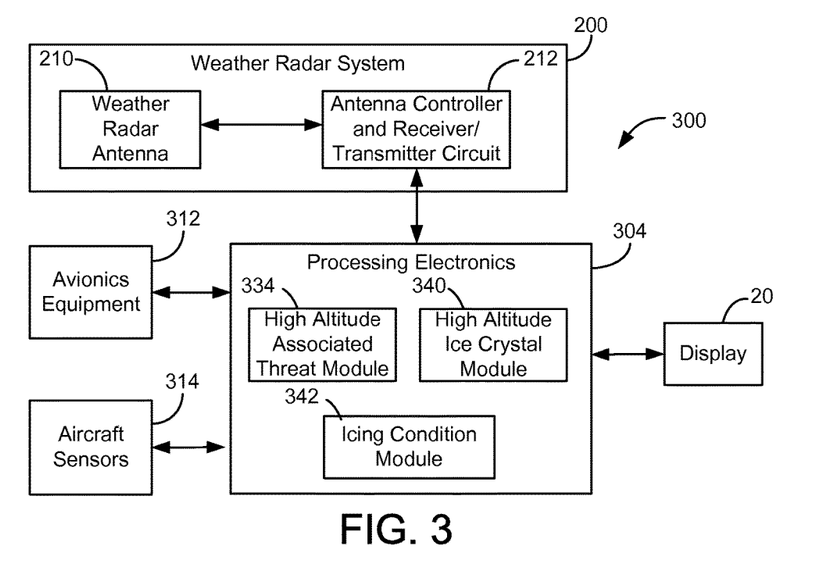
FIG. 3 is a general block diagram of a hazard warning system including an icing condition module, according to some embodiments.

Referring to FIG. 3, a block diagram of a hazard warning system 300 includes or is in communication with the radar system 200 in some embodiments. The hazard warning system 300 includes processing electronics 304 and includes or is coupled to avionics equipment 312 and aircraft sensors 314. The hazard warning system 300 uses the processing electronics 304 to detect an icing condition and provide an auditory warning or a visual symbol of the icing condition to the display 20.

The processing electronics 304 are connected to or in communication with the avionics equipment 312 and the aircraft sensors 314 and include a high altitude associated threat (HAAT) module 334, a high altitude ice crystal (HAIC) module 340, and an icing condition module 342. The HAAT and HAIC modules 334 and 340 advantageously detect and locate HAAT and HAIC conditions, and the icing condition module 342 uses data from the HAAT and HAIC modules 334 and 340 to cause the display 20 to provide a visual and/or audio warning of an icing condition. In some embodiments, the icing condition module 342 uses a summation of ice crystal concentration levels at areas or bins along a radial or direction and compares the summation to a threshold to sense or detect an icing condition. In some embodiments, ice crystal concentration levels are provided by the HAAT and HAIC modules 334 and 340, by off aircraft equipment via the avionics equipment 312 (e.g., radios), by the radar system 200, by the aircraft sensors 314, or combinations thereof.

In some embodiments, the icing condition module 342 receives or calculates an icing concentration parameter per area or bin, accumulates the parameter along a radial, route, flight path, or direction, and compares the accumulated value to a threshold indicative of an icing condition level. In some embodiments, the parameter is a directly sensed indication of ice particle concentration or a prediction or inference of such concentrations.

In some embodiments, the icing condition module 342 uses Equation 1 below to detect an icing condition along a particular a radial, route, flight path, or direction.

$$\text{Provide icing condition symbol for a radial or direction when } \sum_{k=1}^{n} I_k \geq T(\text{engine type, aircraft type}) \quad \text{(Equation 1)}$$

Where
  n=number of range bins to maximum detection range
  $I_k$=Predicted ice crystal concentration in the k'th range bin along the radial or direction
  T=Threshold In some embodiments, the threshold T is a fixed number or is a function of engine type, exposure time, and aircraft type. The threshold T is lower for high efficiency, high bypass turbofan engines. The threshold T can also be a function of the operating mode of the engine (e.g., the threshold is lower for fuel efficient mode) or time of exposure.

In some embodiments, the icing condition module 342 uses Equation 2 below to detect an icing condition along a particular a radial, route, flight path, or direction.

$$\text{Provide icing condition symbol when at specific bin } n \text{ along a radial or direction where } \sum_{k=1}^{n-1} I_k < T(\text{engine type, aircraft type}) \text{ and } \sum_{k=1}^{n} I_k \geq T(\text{engine type, aircraft type}) \quad \text{(Equation 2)}$$

Equation 2 allows the symbol to represent a range to the icing condition. Equations 1 and 2 are exemplary only. Bins between the aircraft 101 and the bin before the summation exceeding the threshold are not presented as being subject to an icing condition according to Equation 2 and hence are eliminated from the display 20 in some embodiments.

In some embodiments, the HAAT and HAIC modules 334 and 340 process data associated with weather radar reflectivity levels and data from other sensors (e.g., temperature, altitude, etc.) to determine HAAT and HAIC conditions and provide icing concentration measurements or estimates to the icing condition module 342. For example, HAAT and HAIC modules 334 and 340 can estimate icing conditions (or ice crystal concentrations at locations based upon temperature, altitude, wind speed, and reflectivity levels.

The processing electronics 304 are further shown as connected to aircraft sensors 314 which may generally include any number of sensors configured to provide data to processing electronics 304. For example, the aircraft sensors 314 include temperature sensors, humidity sensors, infrared sensors, altitude sensors, a gyroscope, a global positioning system (GPS), or any other aircraft-mounted sensors that may be used to provide data to the processing electronics 304 in some embodiments. It should be appreciated that the aircraft sensors 314 (or any other component shown connected to the processing electronics 304) may be indirectly or directly connected to the processing electronics 304. Avionics equipment 312 can be or include a flight management system, a navigation system, a backup navigation system, or another aircraft system configured to provide inputs to the processing electronics 304.

In some embodiments, the radar system 200 is a weather radar system. The radar system 200 includes the radar antenna 210 (e.g., a weather radar antenna) connected (e.g., directly, indirectly) to an antenna controller and receiver/transmitter circuit 212. The antenna controller and receiver/transmitter circuit 202 includes any number of mechanical or electrical components or modules for steering a radar beam and receiving radar returns and providing radar data. For example, the antenna controller and receiver/transmitter circuit 202 is configured to mechanically tilt the radar antenna 210 in a first direction while mechanically rotating the radar antenna 210 in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). The antenna controller and receiver/transmitter circuit 202 is configured to conduct the actual signal generation that results in a radar beam being provided from the radar antenna 310 and to conduct the reception of returns received at the radar antenna 310. Radar return data is provided from the antenna controller and receiver/transmitter circuit 202 to processing electronics 304 for processing. For example, processing electronics 304 can be configured to interpret the returns for display on display 20.

The processing electronics 304 is configured to provide control signals or control logic to the antenna controller and receiver/transmitter circuit 202 in some embodiments. For example, depending on pilot or situational inputs, the processing electronics 304 can be configured to cause the antenna controller and receiver/transmitter circuit 202 to change behavior or radar beam patterns. The processing electronics 304 include the processing logic for operating weather radar system 200 in some embodiments. It should be noted that the processing electronics 304 are integrated into the radar system 200 or located remotely from the radar system 200, for example, in aircraft control center 10 in some embodiments.

Figure 4:
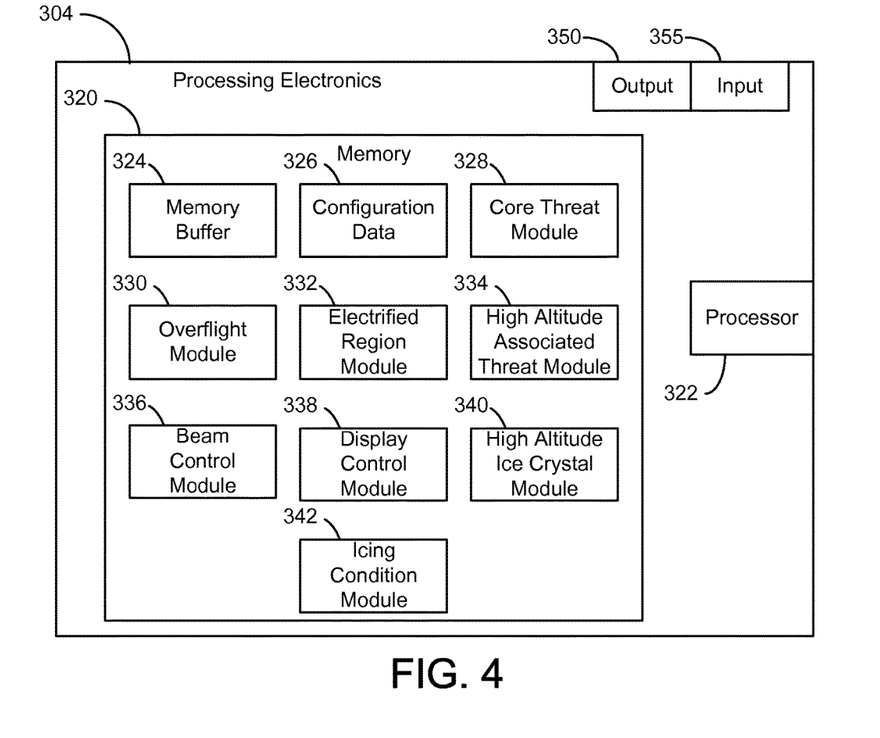
FIG. 4 is a more detailed block diagram of the hazard warning system illustrated in FIG. 3.

Referring to FIG. 4, a detailed block diagram of the processing electronics 304 of FIG. 3 is shown, according to some embodiments. The processing electronics 304 includes a memory 320 and a processor 322. The processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, the processor 322 is configured to execute computer code stored in the memory 320 to complete and facilitate the activities described herein. The memory 320 can be any volatile or non-volatile memory device capable of storing data or computer code relating to the activities described herein. For example, the memory 320 includes the modules 328-342 which are computer code modules (e.g., executable code, object code, source code, script code, machine code, etc.) configured for execution by the processor 322. When executed by the processor 322, the processing electronics 304 is configured to complete the activities described herein. In some embodiments, modules 328-342 can be circuitry configured for the operations described herein. The processing electronics 304 include hardware circuitry for supporting the execution of the computer code of the modules 328-342 in some embodiments. For example, the processing electronics 304 include hardware interfaces (e.g., an output 350) for communicating control signals (e.g., analog, digital) from the processing electronics 304 to the antenna controller and receiver/transmitter circuit 212 or to the display 20. The processing electronics 304 may also include an input 355 for receiving, for example, radar return data from the antenna controller and receiver/transmitter circuit 212, feedback signals from the antenna controller and receiver/transmitter 212 or for receiving data or signals from other systems or devices.

The memory 320 includes a memory buffer 324 for receiving radar return data. The radar return data may be stored in memory buffer 324 until buffer 324 is accessed for data. For example, a core threat module 328, an overflight module 330, an electrified region module 332, the HAAT module 334, a display control module 338, the HAIC module 340, the icing detection module 342 or another process that utilizes radar return data may access the memory buffer 324. The radar return data stored in memory 320 may be stored according to a variety of schemes or formats. For example, the radar return data may be stored in an x,y or x,y,z format, a heading-up format, a north-up format, a latitude-longitude format, a radial format, or any other suitable format for storing spatial-relative information.

The memory 320 further includes configuration data 326. The configuration data 326 includes data relating to weather radar system 200. For example, the configuration data 326 may include beam pattern data which may be data that a beam control module 336 can interpret to determine how to command the antenna controller and receiver/transmitter circuit 202 to sweep a radar beam. For example, configuration data 326 may include information regarding maximum and minimum azimuth angles of horizontal radar beam sweeps, azimuth angles at which to conduct vertical radar beam sweeps, timing information, speed of movement information, dual polarization mode information, dual frequency mode information and the like. The configuration data 326 may also include data, such as threshold values, model information, aircraft identification data, engine identification data, engine mode data, look up tables, and the like used by modules 328-342 to identify and assess threats to aircraft 101.

The memory 320 is further shown to include a core threat module 328 which includes logic for using radar returns in memory buffer 324 to make one or more determinations or inferences relating to core threats to aircraft 101. For example, the core threat module 328 may use temperature and radar return values at various altitudes to calculate a probability that lightning, hail, and/or strong vertical shearing exists within a weather cell. The core threat module 328 may be configured to compare the probability and/or severity of the core threat to a threshold value stored, for example, in the core threat module 328 or the configuration data 326. The core threat module 328 may further be configured to output a signal to display control module 338 indicative of the probability of the core threat, of the inferred threat level within the weather cell, or of the inferred threat level within the weather cell being greater than the measured threat due to radar returns from rainfall. The signal may further cause a change in a color on aviation display 20 associated to the threat level to aircraft 101.

The memory 320 is further shown to include an overflight module 330 which includes logic for using radar returns in memory buffer 324 to make one or more determinations or inferences based on weather below aircraft 101. For example, overflight module 330 may be configured to determine the growth rate of a weather cell and/or the change in altitude of an echo top of a weather cell over time. The overflight module 330 may further be configured to calculate a probability that a weather cell will grow into the flight path of aircraft 101. The overflight module 330 may be configured to output a signal to display control module 338 indicating the threat of the growing weather cell in relation to the flight path of aircraft 101. For example, the signal may indicate predicted intersection of the flight path of aircraft 101 and the weather cell, rate of growth of the weather cell, or predicted growth of the weather cell to within a threshold distance of the flight path of aircraft 101. For example, the signal may cause an icon to be displayed on the display 20 in a location corresponding to the growing cell, wherein the size of the icon may represent the size, amount, or probability of threat to the aircraft. The overflight module 330 may be configured to inhibit display of weather far below, and thus not a threat to, the aircraft 101. The overflight module 330 is configured to provide information related to the flight path of the aircraft 101 for use in selection flight paths or radials for detecting icing condition using the icing condition module 342.

The memory 320 is further shown to include an electrified region module 332 which includes logic for using radar returns in the memory buffer 324 to make one or more determinations or inferences regarding potentially electrified regions around the weather cell. For example, the electrified region module 332 may be configured to use temperature and reflectivity to determine whether a region around a weather cell is likely to produce lightning. The electrified region module 332 may be configured to determine a probability of aircraft 101 producing a lightning strike if the aircraft flies through a particular region based on the reflectivity around a convective cell near the freezing layer. The electrified region module 332 may further be configured to cause a pattern to be displayed on the display 20. For example, the electrified region module 332 may be configured to output a signal to the display control module 338 indicating the existence, location, and/or severity of risk of the electrified region.

The memory 320 is further shown to include HAAT module 334 which includes logic for using radar returns (e.g., data) in the memory buffer 324 to make one or more determinations or inferences regarding high altitude associated threats (e.g., threats related to a blow off or anvil region of a weather cell). HAAT conditions can be associated with high severity threat conditions such as hail, lightning, turbulence, etc.

For example, the HAAT module 334 may be configured to use wind speed, wind direction, and size of a weather cell to predict the presence of an anvil region downwind of a weather cell that may contain lightning, hail, and/or turbulence. The HAAT module 334 may be configured to cause a pattern (e.g., a red speckled region) to be displayed on the display 20. For example, the HAAT module 334 and the display control module 338 can be configured to output a signal to display control module 338 indicating the existence, location, and severity or risk of the anvil region. HAAT module 334 can detect a HAAT condition based upon the presence of convective cells reaching high altitudes and having anvil shapes. Such conditions can be sensed using the techniques described in U.S. application Ser. Nos. 13/919,406 and 13/84,893. Ice crystals may be present in a HAAT region. A HAAT condition generally is a more significant threat than a HAIC condition. The HAAT module 334 is configured to determine ice crystal concentrations levels on a per area or per bin basis in some embodiments.

In one embodiment, the HAIC module 340 can infer a HAIC condition. In one embodiment, the HAIC condition can be inferred by the following process. If radar system 300 detects temperature anomalies and large areas of weaker reflectivity in the vicinity of a convective core, vertical scans and/or auxiliary horizontal scans can be commanded via the beam control module 3336 to look for the presence of high water content (high reflectivity) beneath the areas that were depicted as weaker reflectivity (green or black). If such a scenario is identified using the vertical and horizontal beams, the area is tagged as potential for ice crystal icing or a HAIC condition. In some embodiments, the HAIC module 340 configured to estimate ice crystal concentrations levels on a per area or per bin basis (e.g., based upon the difference in water content at altitudes) in some embodiments.

The memory 320 includes the icing detection module 342 which includes logic for using radar returns in the memory buffer 324 to make one or more determinations or inferences regarding ice crystal concentrations per bin or per area. The icing detection module 342 can be combined with the display control module 338, be a hard wired ASIC, or programmable logic circuit in one embodiment. The icing detection module 342 and the radar system 200 can be configured to use coherent and non-coherent integration processes discussed in related U.S. application Ser. No. 14/206,239 incorporated herein by reference to detect ice crystal concentrations and their location in some embodiments. Alternatively, the icing detection module 342 and the radar system 200 can utilize a dual frequency or dual polarization process to determine ice crystal concentrations discussed in related U.S. patent application Ser. No. 14/206,651 incorporated herein by reference in some embodiments. In some embodiments, radar return data is be processed by comparing the data to known ice crystal return characteristics to determine an icing concentration level match. The ice crystal concentrations can be provided by an external source. The icing detection module 342 can use various techniques for determining ice crystal concentrations on a per bin or per area basis. The types of ice crystal concentration detection techniques are not discussed in a limiting fashion.

The icing detection module 342 can be configured to cause a line or bar (as icing condition symbol 42 (FIG. 1)) to be displayed on the display 20 in in some embodiments. The icing condition symbol is provided in response to Equations 1 or 2 executed by the icing condition module 342 in some embodiments. In some embodiments, the icing condition symbol represents a location of the icing condition and severity or risk of the icing condition in some embodiments. The display control module 338 causes the appropriate video signal to be provided to the display 20 for display of the icing condition symbol in some embodiments.

The memory 320 includes a beam control module 336. The beam control module 336 may be an algorithm for commanding circuit 302 to sweep a radar beam. The beam control module 336 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. The beam control module 336 may be configured to control timing of the beam sweeps or movements relative to aircraft speed, flight path information, transmission or reception characteristics from the radar system 200 or otherwise. The beam control module 336 may receive data from the configuration data 326 for configuring the movement of the radar beam.

The memory 320 includes the display control module 338 which includes logic for displaying weather information on the display 20. For example, the display control module 338 may be configured to display radar return information received from the memory buffer 324 and to determine a gain level or other display setting for display of an inferred threat to aircraft 101 on a weather radar display.

Figure 5:
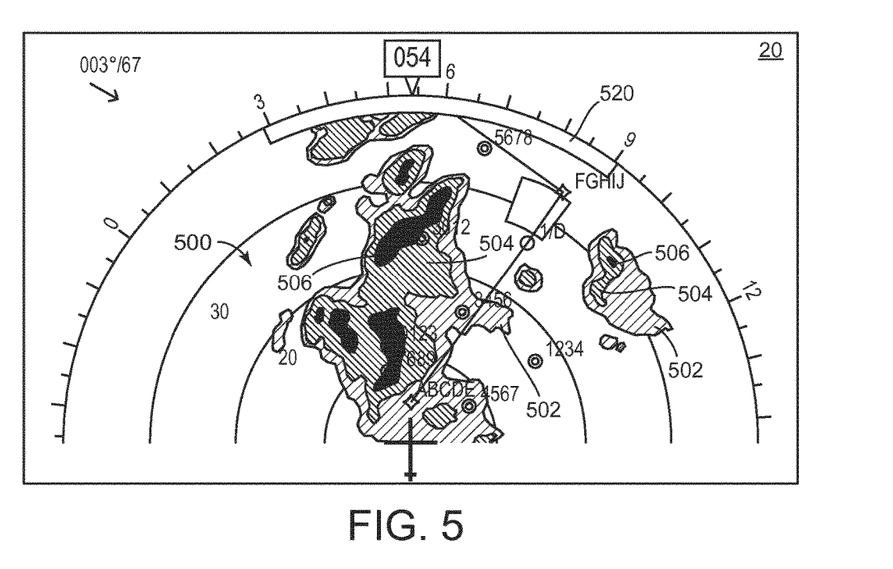
FIG. 5 is a schematic illustration of a horizontal plan view weather display showing an icing condition warning according to some embodiments.

Referring now to FIG. 5, a schematic illustration of the display 20 showing a weather radar display image 500 including precipitative (or weather) regions 502, 504, and 506 corresponding to radar returns according to an exemplary embodiment. The processing electronics 304 (FIG. 4) is configured to cause the display 20 to show measured threats to aircraft 101 using symbology, icons, or text. In FIG. 5, light rain is shown as a slanted down right to left cross hatched area region (e.g., region 502), which is often indicated with a green color on display 20. A moderate rain is shown as a slanted down left to right cross hatched region (e.g., region 504) in FIG. 5 often colored yellow on display 20 to indicate caution to the crew. Solid black regions (e.g., region 506) in FIG. 5 correspond to heavy rain, and are usually colored red on display 20 to indicate warning to the crew. The area outside of regions 502, 504, and 506 can have a black color on display 20 to indicate a very low or zero precipitation rate in one embodiment. The regions 502, 504, and 506 can be shown in accordance with Federal Aviation Administration (FAA) standards.

In some embodiments, an icing condition symbol 520 is provided outside of or at the edge of the displayed range for the weather radar display image 500 as a colored bar. The icing condition symbol 520 is arcuate and colored to represent a level of the icing condition. Equation 1 can be used to determine the radials that are delineated by the icing condition symbol 520. The icing condition symbol 520 is computed for each azimuth angle as the summation of predicted ice crystal concentration over all range bins out to the maximum detection range of the function. As shown in FIG. 5, an icing condition is detected in azimuth from 30 to 00 degrees.

Display of the icing condition symbol 520 is triggered when the integrated ice crystal concentration exceeds a given threshold in some embodiments. The threshold is a function of aircraft type or engine type in some embodiments. Multiple thresholds are used for multiple levels (e.g, red, yellow, green). The specific color of the icing condition symbol 520 represents specific threshold concentration in some embodiments. The weather radar display image 500 using the using the icing condition symbol 520 has the advantage of removing large icon covered areas for icing warnings from the weather display image 500 and concentrating the data only in the outer range ring thus providing heading guidance to the crew while simultaneously avoiding confusion with other navigation or textual information in some embodiments.

Generally, a crew flies through green regions 502, always avoids red regions 506, and uses their best judgment on yellow regions 504. In the example shown in FIG. 5, a crew heading to the right of the aircraft's track on display 500 may decide to bank right and fly through regions 502 rather than climbing or banking left to avoid the weather cell (region 506) directly in front of aircraft 101 and the icing condition represented by the icing condition symbol 520.

Figure 6:
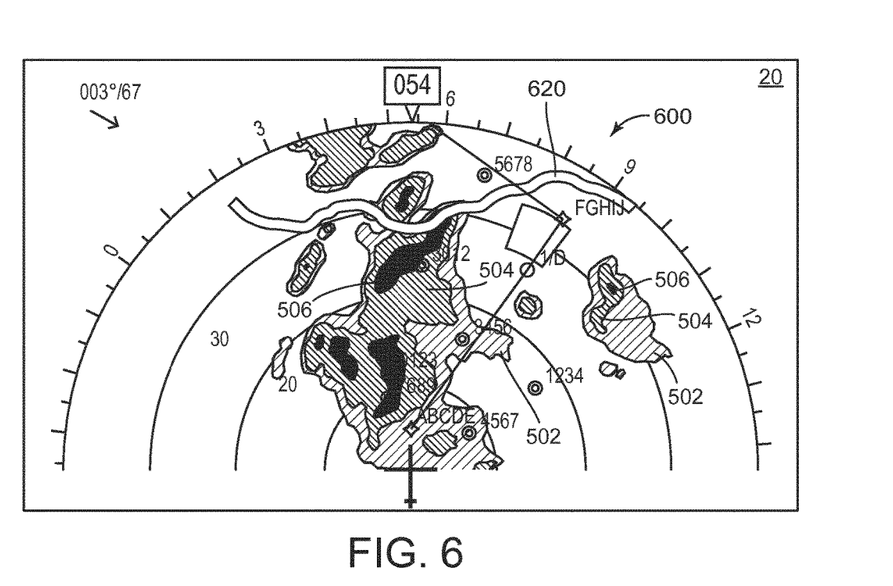
FIG. 6 is a schematic illustration of a horizontal plan view weather display showing an icing condition warning, according to some embodiments.

Referring now to FIG. 6, a schematic illustration of the display 20 showing a weather radar display image 600 including precipitative (or weather) regions 602, 604, and 606 (similar to the regions 502, 504 and 506) corresponding to radar returns according to an exemplary embodiment. The processing electronics 304 (FIG. 4) is configured to cause the display 20 to show measured threats to aircraft 101 using symbology, icons, or text.

In some embodiments, an icing condition symbol 620 is provided as a contoured bar or line representing the range to the icing condition. The icing condition symbol 620 is colored to represent a level of the icing condition in some embodiments. Equation 2 can be used to determine the radials and range that are delineated by the icing condition symbol 620 where the contoured bar indicates range and azimuth at which point hazardous ice accretion is expected in some embodiments.

In some embodiments, the icing condition symbol is icon, such as, a colored wind shear-type icon covering an area of the icing condition. The color represents a level of the icing condition (e.g., mild, moderate, severe) The azimuth extent of the icon is determined as all azimuth radials in which the summation of predicted ice concentration exceeds a predetermined threshold as provided by Equation 1 in some embodiments. The maximum range of the icon is the range where the summation of the predicted ice content exceeds the threshold as provided by Equation 2 in some embodiments. This type of symbol has the advantage of clearly delineating both range and azimuth extent of the hazard in an unambiguous manner which is difficult to confuse with other iconic information on the display 20.

In some embodiments, the icing condition module 342 (FIG. 4) takes into account the duration of exposure of ice crystals which exceed a given threshold. This duration is computed based on aircraft airspeed. While the integration-based detection discussed above is generally spatial in nature (e.g., the ice crystal concentration is accumulated along the radials originating from the existing aircraft position until a threshold was reached at which point the icing condition symbol is applied), a refinement of this integration scheme takes into account the duration of exposure of ice crystals which exceed a given threshold. This duration is computed based on aircraft airspeed. For example, for each bin along a given radial, the mean of ice crystal accumulation (e.g., ice crystal concentration) is computed for a given distance D in front of each bin. The distance D is computed based on a predetermined threshold of duration for ice crystal exposure and the airspeed of the aircraft. The icing condition symbol or warning is provided when the mean of ice crystal accumulation over the distance D exceeds a second threshold in some embodiments. Example I below provides pseudo code for duration of exposure-based icing warnings according to some embodiments. Example 1 below provides an exemplary scheme and does not limit the claims or the discussion of the embodiments disclosed herein.

Figure 7:
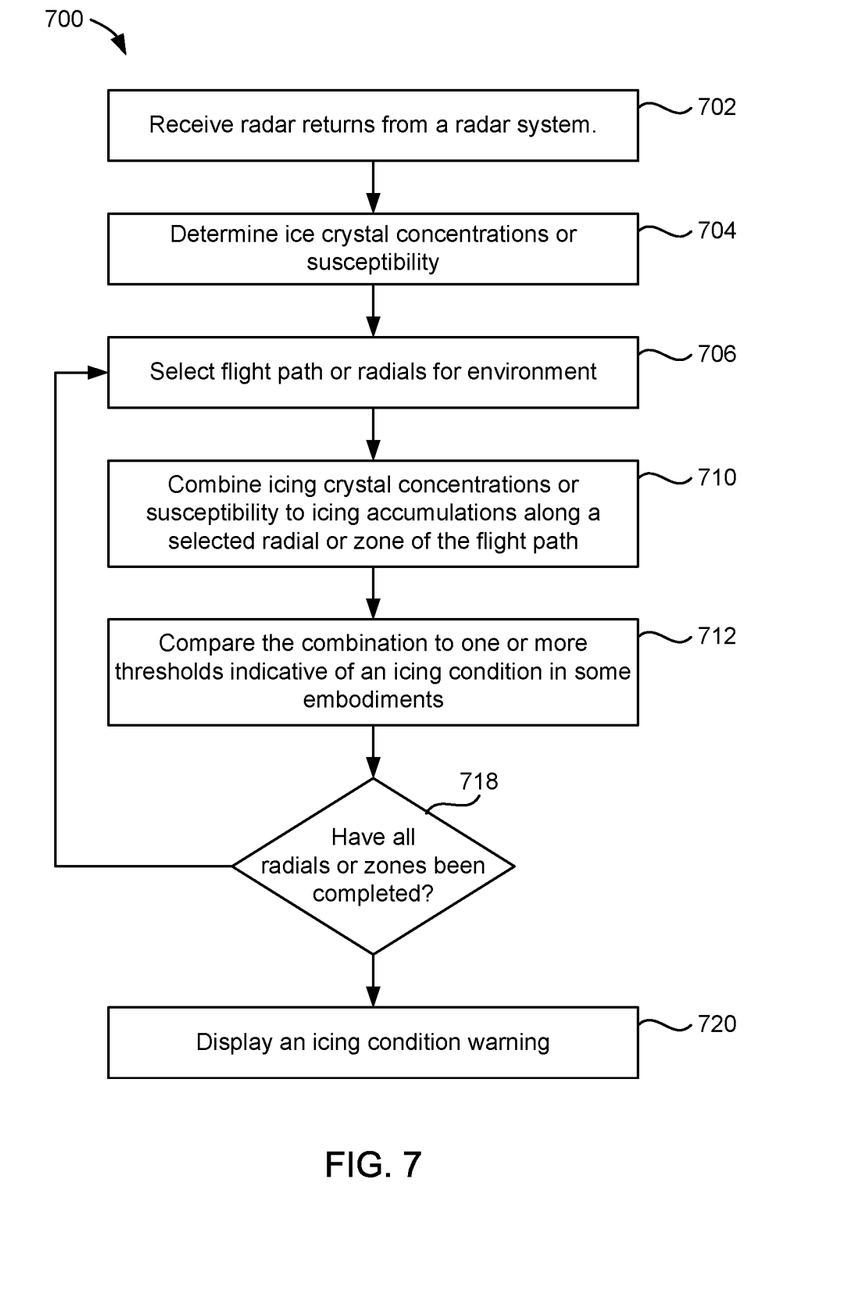
FIG. 7 is a schematic flow diagram showing icing condition detection operations, according to some embodiments.

Referring to FIG. 7, a flow 700 is performed by hazard warning system 300 (FIG. 2) for icing detection and warning. At an operation 702, radar returns are received from the radar system 200. At an operation 704, ice crystal concentrations or susceptibility to icing accumulations are determined. In some embodiments, the ice crystal concentrations are determined on a per bin basis from the radar return data (e.g., polarized returns, dual frequency returns, power returns), the radar return data and other sensor data or warnings (e.g., altitude, temperature, blow off regions, cells, HAIC, HAAT, etc.), external data (e.g., NEXRAD, Satellite, etc.), or combinations thereof.

At an operation 706, zones for a flight path or radials for environment are selected. At an operation 710, icing crystal concentrations or susceptibility to icing accumulations are combined along a selected radial or zone of the flight path. The icing crystal concentrations or susceptibility to icing accumulations can be combined by summing or integrating in some embodiments by the icing condition module 342. At an operation 712, the combination is compared to one or more thresholds indicative of an icing condition in some embodiments. The thresholds can be a function of aircraft type, aircraft engine, or engine operational mode in some embodiments.

At an operation 718, the hazard warning system 300 determines if all radials or zones have been completed. If not, the hazard warning system 300 returns to operation 706 and completes the operations 706, 710 and 712 for the next radial or zone. If so, the hazard warning system 300 advances to the operation 720 and displays an icing condition warning. In some embodiments, the icing condition warning is indicative of the azimuthal extent and range to the icing condition.

Example I - A Pseudo Code for Icing Condition Detection Using Ice Crystal Exposure Time

```
Stating:
    T_T = Threshold time for engine rollback
    IWC_T = IWC threshold for engine rollback
    D_T = Threshold distance for engine rollback
    V_AC = Aircraft velocity
    RangeBinLength = extent of a range bin
    Range_MAX = max range of the HAIC function
    RangeBin_MAX = index of the max range bin of the HAIC
      function
    Radiale_MAX = max number of radiale in a scan
    IWC(radiale_index,range_bin_index) = IWC estimated in a
      specific range bin index in a specific radiale
    HAIC_ALERT(radiale_index,range_bin_index) = Alert to be
      raised in a specific range bin and specific radiale
We have:
    D_T = V_AC × T_T
    for radiale_index = 1:Radiale_MAX
        for range_bin_index = 1:RangeBin_MAX
            start_analysis_range_bin = range_bin_index;
            end_analysis_range_bin = start_analysis_range_bin + D_T /
              RangeBinLength;
            IWCmean = sum(IWC(radiale_index
            , start_analysis_range_bin:end_analysis_range_bin)) /
            (end_analysis_range_bin – start_analysis_range_bin);
                if IWCmean > IWC_T
                    HAIC_ALERT(radiale_index,range_bin_index+
    end_analysis_range_bin) = TRUE;
                else
                    HAIC_ALERT(radiale_index,range_bin_index+
    end_analysis_range_bin) = FALSE;
            end
        end
    end
```

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the inventive concepts disclosed herein.

According to various exemplary embodiments, electronics 304 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. The processes can be performed separately, simultaneously, sequentially or independently with respect to each other.

While the detailed drawings, specific examples, detailed algorithms and particular configurations given describe exemplary embodiments, they serve the purpose of illustration only. The inventive concepts disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flows and pseudo code show exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
a processing system configured to cause an electronic display to display an icing condition symbol in response to a presence of an icing condition, the processing system being configured to determine the presence of the icing condition using summation of an icing concentration factor at locations along a first direction, wherein the first direction is along a radial or a flight path and the icing concentration factor is an ice particle concentration per bin, wherein the locations are each associated with a bin associated with an area along the radial, the radial being a second direction of a radar beam, wherein each area is between a maximum radar range and an antenna associated with the radar beam along the radial.

2. The aircraft hazard warning system of claim 1, wherein the locations extend to a maximum detection range.

3. The aircraft hazard warning system of claim 1, wherein the icing condition symbol is a bar presented at an edge of a scan range of the electronic display.

4. The aircraft hazard warning system of claim 1, wherein the icing condition symbol is a bar presented at an edge of a scan range of the electronic display and extends across an azimuth range associated with azimuthal extent of the icing condition.

5. The aircraft hazard warning system of claim 1, wherein the icing condition symbol is colored to represent a level of the icing condition.

6. The aircraft hazard warning system of claim 1, wherein the summation is compared to at least one threshold representing the icing condition.

7. The aircraft hazard warning system of claim 6, wherein the threshold is a function of aircraft type or engine type.

8. The aircraft hazard warning system of claim 1, wherein the locations are areas along a radial.

9. The aircraft hazard warning system of claim 1, wherein the locations are associated with weather radar range bins along the radial.

10. The aircraft hazard warning system of claim 1, wherein the icing condition symbol is a contoured bar representing a range to the icing condition for a plurality of radials on the electronic display.

11. The aircraft hazard warning system of claim 10, wherein the presence of the icing condition is determined at the locations where the summation is above a threshold along the radial and an absence of the icing condition is determined at the locations along the radial where the summation is below the threshold.

12. The aircraft hazard warning system of claim 1, wherein the icing condition symbol represents an area of the icing condition for a plurality of radials on the electronic display, wherein the area is determined using the summation at each of the radials.

13. A method of providing an icing condition symbol on an electronic aircraft display using an electronic processor, the method comprising:
receiving radar reflectivity data;
determining an ice concentration factor for each of a plurality of range bins associated with respective locations; and
displaying the icing condition symbol in response to a summation of the ice concentration factor at each of the range bins and a threshold, wherein the threshold is determined based upon an engine type or engine operating mode.

14. The method of claim 13, wherein the summation is comprised of the ice concentration factor for the range bins along a radial.

15. The method of claim 13, wherein the electronic processor is part of an avionic weather radar system.

16. The method of claim 13, wherein the threshold is a function of aircraft type.

17. The method of claim 14, wherein the threshold is two or more thresholds.

18. An aircraft weather radar system, comprising:
a radar antenna configured to receive radar returns; and
a processing system in communication with the radar antenna and configured to receive the radar returns and provide radar return data, the processing system being configured to determine a plurality of ice concentration factors for a plurality of respective range bins associated with the radar returns using the radar return data, the processing system being configured to determine a presence of an icing condition using a summation of the ice concentration factors and a threshold, wherein each of the ice concentration factors are an ice particle concentration per a respective range bin of the range bins.

19. The aircraft weather radar system of claim 18 further comprising:
   a display for providing weather images, the display providing an icing condition symbol as a bar at a maximum range of the display or as a contoured bar within the maximum range.

20. The aircraft weather radar system of claim 18 further comprising:
   a display for providing weather images, the display providing an icing condition symbol representing an area of the icing condition.

\* \* \* \* \*